United States Patent [19]

Harmand

[11] Patent Number: 4,852,306

[45] Date of Patent: Aug. 1, 1989

[54] TOOLHOLDER DEVICE FOR A MACHINE TOOL

[76] Inventor: Pierre Harmand, 47, route de Vovray, 74000 Annecy, France

[21] Appl. No.: 104,068

[22] Filed: Oct. 5, 1987

[30] Foreign Application Priority Data

Oct. 7, 1986 [FR] France .................. 86 14079

[51] Int. Cl.$^4$ ............................................. B24B 19/00
[52] U.S. Cl. ........................... 51/241 VS; 51/241 R
[58] Field of Search .......... 51/241 R, 241 S, 241 VS, 51/109 R, 126

[56] References Cited

U.S. PATENT DOCUMENTS

| | | | |
|---|---|---|---|
| 2,796,788 | 6/1957 | Bohn . | |
| 4,180,946 | 1/1980 | Heijkenskjold et al. | 51/134.5 R |
| 4,365,917 | 12/1982 | Harmand | 409/201 |
| 4,461,463 | 7/1984 | Okubo | 269/60 |

FOREIGN PATENT DOCUMENTS

| | | |
|---|---|---|
| 434379 | 10/1925 | Fed. Rep. of Germany ... 51/241 VS |
| 2644380 | 4/1977 | Fed. Rep. of Germany . |
| 1555211 | 12/1968 | France . |
| 2109150 | 5/1972 | France . |
| 2535479 | 5/1984 | France . |

*Primary Examiner*—Frederick R. Schmidt
*Assistant Examiner*—Maurina Rachuba
*Attorney, Agent, or Firm*—Oliff & Berridge

[57] ABSTRACT

The present invention relates to a toolholder device for a machine tool.

A device according to the invention integral with a table (3) moveable in two directions perpendicular to one another comprises a toolholder spindle (1), a sleeve (2) with a lower bearing surface (2a) of convex sphericity, a housing (3) with a seat (3a) of concave sphericity, and means (4) for generating a magnetic field which repel or attract the bearing surface of the sleeve and which are associated with the seat (3a).

The invention is used particularly in toolholder spindles for valve-seat grinders.

7 Claims, 3 Drawing Sheets

TOOLHOLDER DEVICE FOR A MACHINE TOOL

BACKGROUND AND SUMMARY OF THE INVENTION

The present invention relates to a toolholder device for a machine tool and more particularly toolholder spindles for valve-seat grinders.

According to the patent EP-C-No. 22,796, the toolholder spindle described is integral with a table moveable in a plane in two directions perpendicular to one another and comprises:

- a toolholder spindle;
- a means for the angular orientation of the spindle relative to the plane, formed by a sleeve with two bearing surfaces, one upper and the other lower, of convex sphericity, and by a housing with a lower seat of matching concave sphericity;
- the sleeve being capable of being successively locked and released relative to the housing by means of an upper seat moveable relative to the housing;
- and means for supporting the sleeve relative to the housing without friction during the release phase, in the form of a gas stream providing a cushion between the sleeve and the seats mentioned above.

Such a spindle, because of its low inertia, can be positioned accurately, and its effectiveness in this respect has been shown in many uses, particularly for valve-seat grinding machines.

Nevertheless, such a spindle seems more suitable for the machining of workpieces by the unit than for large-series operations or jobs because of the limitations explained below.

First of all, in an industrial environment, the technique of a gas cushion is usually put into practice by providing, between the sleeve and the housing, an open air circuit obtained from a compressed-air source and from calibrated leaks towards the outside. Consequently, if a closed circuit of a suitable gas (for example, nitrogen) is relinquished, it seems difficult to obtain a cushion of constant thickness, especially because of the temperature variations which affect the supporting air and which change the pressure and/or flow of the latter. Moreover, because condensates or moisture are present in the available compressed air, it is necessary to use additional filtration or condensation devices. For all these reasons, it appears difficult, in practice, in an industrial environment to control the air cushion in the critical region between the sleeve and the housing.

Secondly, the spindle combined with its mechanism for driving the rotation represents a relatively large mass. From the moment when the spindle is positioned relative to the workpiece to be machined, the inertia of this assembly in relation to the absence of any appeciable friction between the sleeve and the housing generates oscillations of the workpiece which are of decreasing amplitude, until the desired state of equilibrium is reached; this results in a relatively long time for setting up the spindle, and this is often incompatible with large-series machining operations. Or if machining, for example grinding, begins before the state of equilibrium of the spindle is reached, it will be impossible to achieve the desired machining accuracy.

The present invention proposes to overcome all these disadvantages, and, particularly for a toolholder spindle, such as that defined above, it looked for another way of supporting the sleeve relative to the housing, allowing large-series machine operations to be carried out in an industrial environment.

According to the invention, and in general terms, means for generating a magnetic field, for example a magnet, are associated with the lower seat of the housing, and control means make it possible to push the lower bearing surface of the sleeve into the position of angular adjustment of the spindle and draw the same bearing surface into a working position of the said spindle.

These means used for supporting a spherical member are known per se and were described, for example, in the U.S. Pat. No. 4,461,463 for orienting a plane surface angularly relative to a plane reference surface, and in the Patent FR-A-No. 2,535,479 for orienting two parts of a space vehicle relative to one another according to three degrees of freedom.

The use of similar means for a toolholder spindle according to the invention gives the latter results or performances which are significant, novel per se and unexpected.

As a result of the present invention, the mechanical arrangement of the toolholder spindle becomes much simpler. In fact, there is no longer any need to use an upper seat, moveable in the manner of a piston relative to the housing, in order to lock the sleeve and therefore the spindle in their working positions. It is sufficient, for this purpose, to cut off the magnetic field or reverse it in order to "stick" the sleeve to its seat.

Moreover, if the magnetic field is regulated in the opposite direction to the oscillations of the sleeve and spindle, it becomes possible to stabilize the latter immediately in its position of equilibrium.

In the same way, it becomes possible to adjust the air gap between the sleeve and the seat and therefore adapt the thickness of the cushion between these two components to the type of machining operation to be carried out.

Likewise according to the invention, the means of driving the spindle in rotation are incorporated within the housing in the form of an electrical stator located in the region of the seat or inside the sleeve, and the spindle or the sleeve connected to the spindle in terms of rotation forms a rotor.

If all the characteristics of the present invention are put into practice, the overall result is a toolholder device, the mechanical arrangement of which becomes very simple.

BRIEF DESCRIPTION OF THE DRAWINGS

The present invention is now described in relation to a toolholder spindle for a valve-seat grinder, with reference to the accompanying drawings in which.

DETAILED DESCRIPTION OF THE PREFERRED EMBODIMENTS

Figure 1:
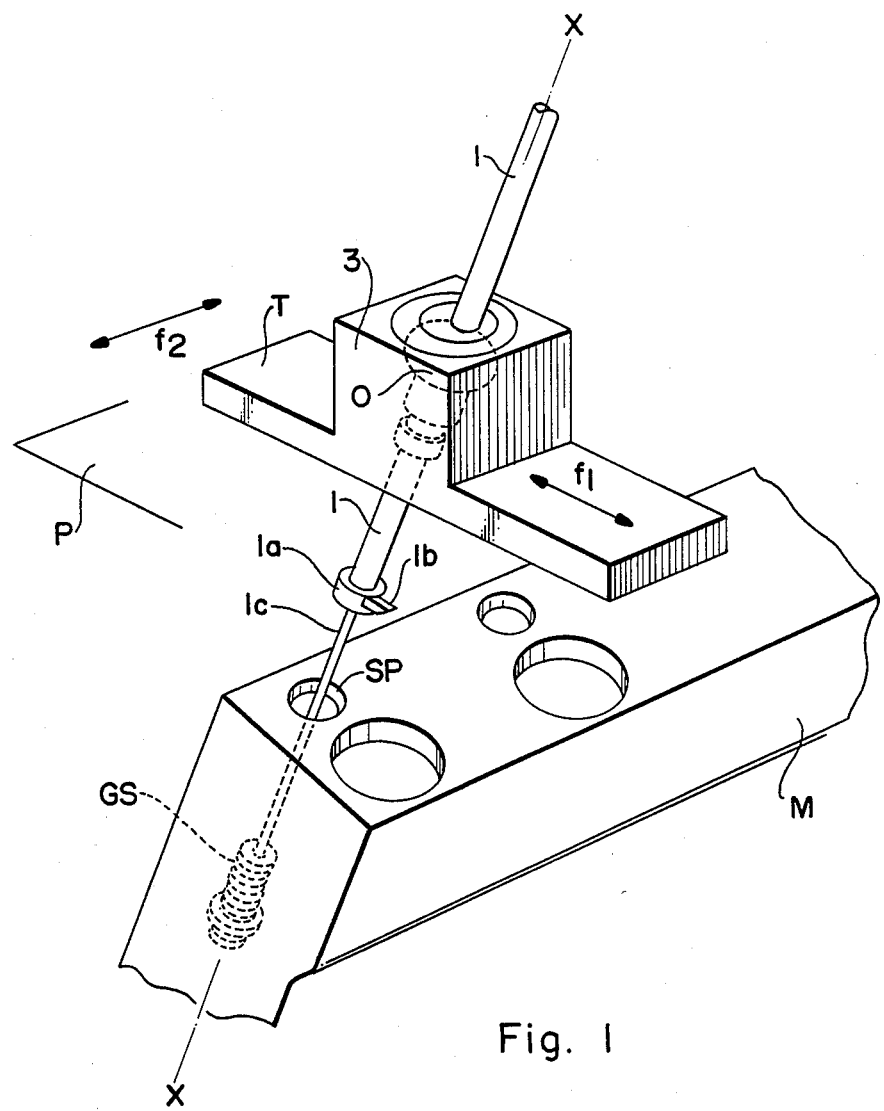
FIG. 1 shows diagrammatically a tooholder device according to the invention.

As can be seen in FIG. 1, this spindle (1) equipped with the toolholder (1a), to which the tool (1b) is fastened, has to assume any position suitable for ensuring that the pilot rod (1c) extending the toolholder can be introduced into the guide (GS) of the valve of the engine (M), a valve seat (SP) of which is to be ground.

In a conventional way, the spindle head (here designated by that of the housing (3)) is subjected to the alternating movements of the table (T), with which it is integral, in a horizontal plane (P) according to the arrows (f1) and (f2).

The object of these movements is to shift the center (O) of the spindle in such a way that its axis (x—x) is in the extension of the axis of the guide (GS) of the valve of the engine (M), the seat (SP) of which is to be ground.

Figure 2:
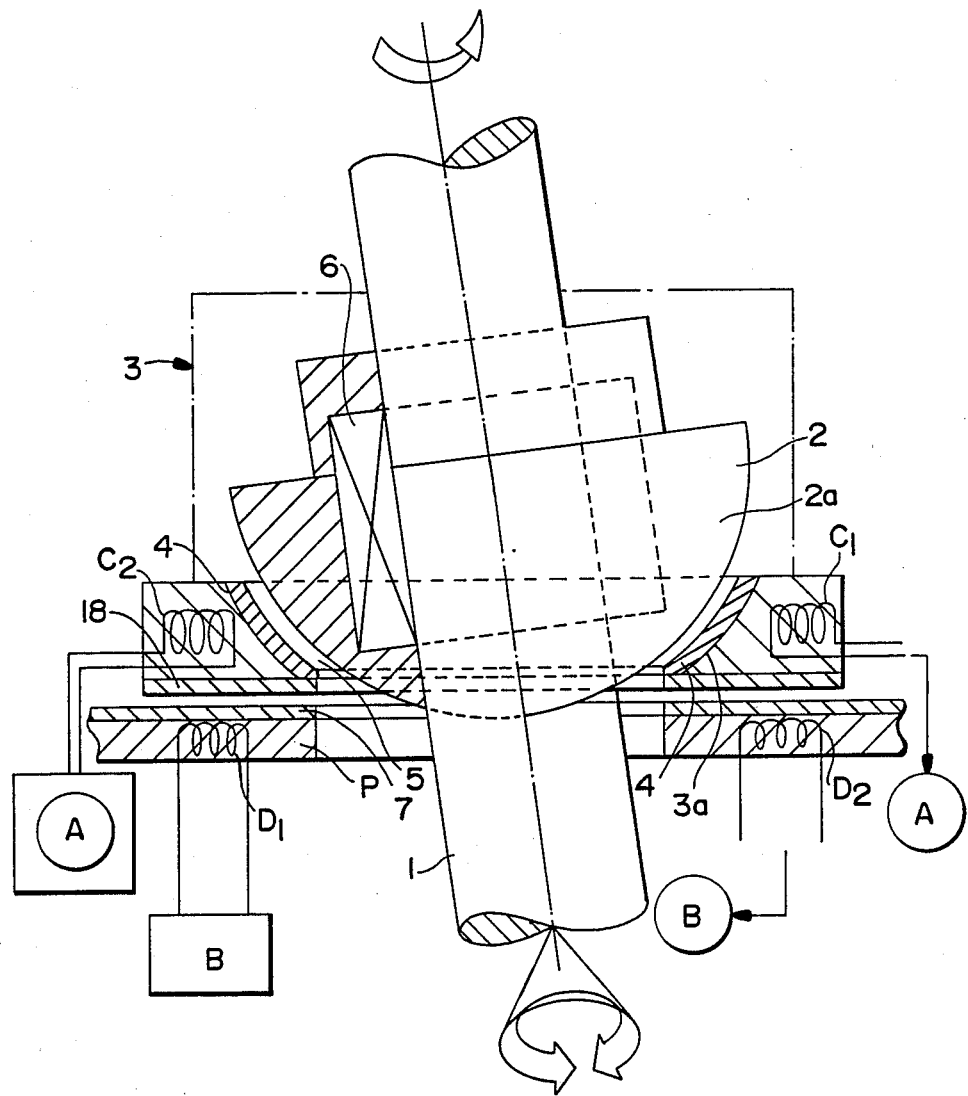
FIG. 2 shows a tooholder spindle according to a first embodiment of the invention.

Referring to FIG. 2, the device according to the invention has, in addition to the toolholder spindle (1), a means for the guidance and angular orientation of the latter relative to the plane (P), formed by:

a sleeve (2) having, in its lower part, a bearing surface (2a) of convex sphericity, with an axial perforation ensuring the free passage of the spindle (1) in terms of both translational movement and rotation;

a housing (3) shown partially diagrammatically and having, in its lower part, a seat (3a) of matching concave sphericity.

Means (4) for generating a magnetic field are associated with the seat (2a), for example in the form of a spherical magnetic cradle, and make it possible, by control means (A, B, discussed below), on the one hand to push the sleeve and spindle into the position of release of the sleeve relative to th housing, in order to position the spindle angularly, and on the other hand to draw or lock the sleeve (2) up against the seat (3) in the position of locking the sleeve relative to the housing, in order to begin the grinding work once the spindle has been positioned.

In FIG. 2, the control means (A) controls the magnetic inducement means ($C_1$, $C_2$) of the means (4) for generating a magnetic field. The magnetic inducement means ($C_1$, $C_2$) are preferably coils. Similarly, the control means (B) controls the magnetic inducement means ($D_1$, $D_2$) (which are preferably coils) of the plane magnet (7).

As regards the means for generating a magnetic field, these can be permanent magnets or electromagnets, relative to which the sleeve behaves as naturally or is induced as a magnet of identical polarity during the release phase or of opposite polarity during the locking phase.

During the release phase, the spherical magnetic cushion (5) allows any angular movement of the spindle, without friction, inscribed within a cone. Adjusting the thickness of the magnetic cushion differentially on either side of the spindle makes it possible to obtain controlled offsets of the spindle (1).

Still according to the invention, instead of driving the spindle in rotation from outside the housing, there are internal electrical means in the form of a stator (6) incorporated in the sleeve (2), the spindle (1) of which constitutes the rotor.

Moreover, the table (T) or, what is the same thing, the housing (3) are supported relative to one another, without friction, by means of a magnetic field generated naturally or artificially by a plane magnet (7) which repels another natural or induced plane magnet (18) located opposite it on the housing (3).

Figure 3:
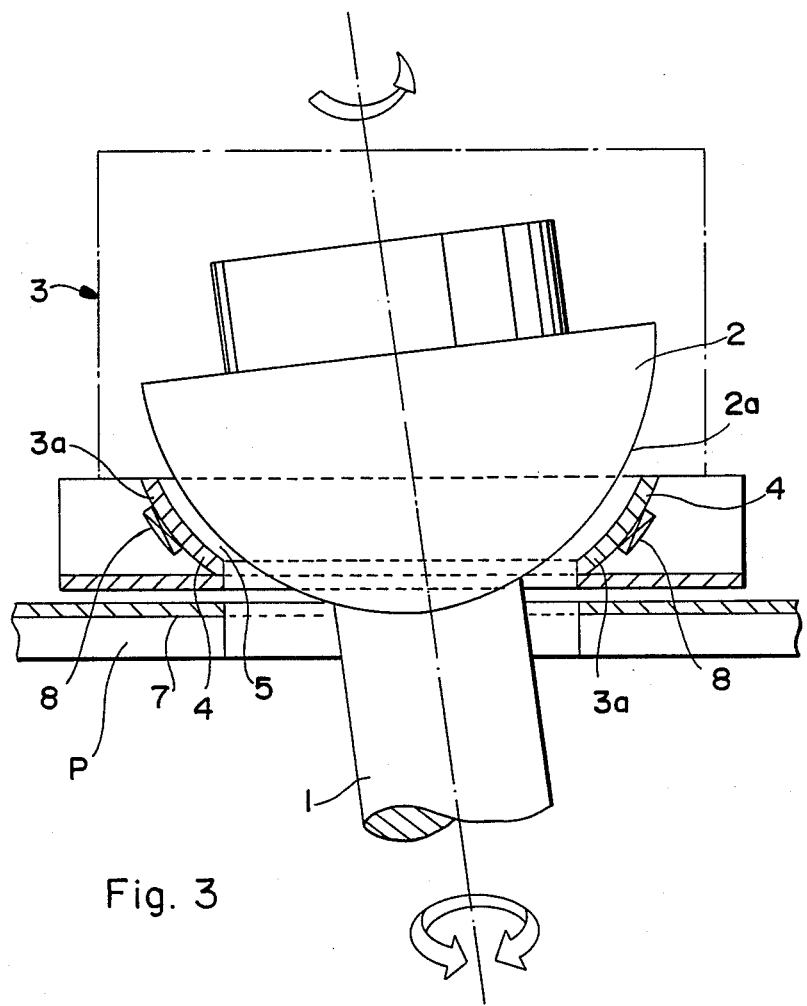
FIG. 3 shows a spindle according to a second embodiment of the invention.

The embodiment according to FIG. 3 differs from the preceding embodiment in that, on the one hand, the spindle (1) is integral with the sleeve (2) in terms of rotation and, on the other hand, internal electrical means for driving in rotation are provided in the form of a stator (8) which can be separate or not from the means (4) for generating a magnetic field towards the sleeve (2), the sleeve associated with the spindle forming the rotor.

According to this embodiment, the sleeve (2) and the seat (3a) function in the manner of a magnetic-bearing electric motor, provided, at the same time, that the sleeve is locked in its angular position as a result of a suitable differential adjustment of the magnetic field, generated by the means (4), on either side of the spindle (2).

In other words, the sleeve (2) can be locked in its angular position by the control means (A) which controls the thickness of the magnetic cushion by adjustment of the magnetic field generated by means (4). Distance sensors (not shown) can be employed to detect and adjust the thickness of the magnetic cushion. Once the angular position of the sleeve (2) is permanently controlled, the sleeve (2) can be rotated with the stator (6) situated on the side of the sleeve (2).

I claim:

1. A toolholder device for a machine tool, integral with a table (T) and movable in a plane (P) in at least one direction, said device comprising a toolholder spindle; guiding means for the guidance and angular orientation of the spindle relative to the plane (P), said guiding means including a sleeve with a bearing surface of convex sphericity and a housing with a seat of matching concave sphericity; means for supporting the sleeve relative to the housing without friction; magnetic means for generating a magnetic field, said magnetic means being associated with the seat of the housing; and control means for controlling the magnetic means to move the bearing surface of the sleeve relative to the seat to adjust the angular position of the spindle and lock the angular position of the bearing surface relative to the seat to maintain a working position of the said spindle.

2. A device as claimed in claim 1, the spindle being free to rotate relative to the sleeve, wherein internal electrical means for driving in rotation are provided in the form of a stator incorporated in the sleeve, a spindle of which constitutes the rotor.

3. A device as claimed in claim 1, wherein, the spindle is integral with the sleeve for rotation and, internal electrical means for driving in rotation is provided in the form of a stator, the sleeve associated with the spindle forming a rotor.

4. A device as claimed in claim 1, wherein the table (T) is supported relative to the plane (P) by means of the magnetic field.

5. A device as claimed in claim 3, wherein the internal electrical means for driving in rotation are integral with the means for generating the magnetic field.

6. A tool holder device for a machine tool comprising:
   a tool holder spindle;
   guide means for the guidance and angular orientation of the spindle relative to a plane (P), said guiding means including a sleeve with a bearing surface of convex sphericity and a housing with a seat of matching concave sphericity;
   magnetic means for generating a magnetic field between said sleeve and said housing to define therebetween a magnetic cushion; and
   control means for controlling the magnetic means to change the thickness of the magnetic cushion to lock the sleeve in an angular position relative to the seat.

7. A device according to claim 6, wherein the spindle is rotatably supported in the sleeve and driving means are provided to rotate the spindle relative to the sleeve, said driving means comprising a stator in the sleeve and a rotor, the rotor being the spindle.

* * * * *